US012596998B2

(12) United States Patent
North et al.

(10) Patent No.: US 12,596,998 B2
(45) Date of Patent: Apr. 7, 2026

(54) SYSTEM AND METHOD FOR A REFURBISHABLE FAN ASSEMBLY

(71) Applicant: Dell Products, LP, Round Rock, TX (US)

(72) Inventors: Travis C. North, Cedar Park, TX (US); Enoch Chen, Wenshan District (TW); Pomin Shih, Beitou District (TW)

(73) Assignee: DELL PRODUCTS LP, Round Rock, TX (US)

( * ) Notice: Subject to any disclaimer, the term of this patent is extended or adjusted under 35 U.S.C. 154(b) by 402 days.

(21) Appl. No.: 18/103,326

(22) Filed: Jan. 30, 2023

(65) Prior Publication Data

US 2024/0257077 A1     Aug. 1, 2024

(51) Int. Cl.
G06Q 10/30 (2023.01)
F04D 29/60 (2006.01)

(52) U.S. Cl.
CPC ............. G06Q 10/30 (2013.01); *F04D 29/60* (2013.01)

(58) Field of Classification Search
CPC ............... F04D 29/4226; F04D 29/281; F04D 13/0626; F04D 25/08; A61M 16/0066; H02K 1/26; H05K 7/20172; H05K 7/20727
See application file for complete search history.

(56) References Cited

U.S. PATENT DOCUMENTS

| | | | | |
|---|---|---|---|---|
| 5,191,230 A | * | 3/1993 | Heung | ...................... G06F 1/20 361/23 |
| 6,616,525 B1 | | 9/2003 | Giraldo | |
| 7,017,059 B2 | | 3/2006 | Law | |
| 7,959,419 B2 | | 6/2011 | Borowski | |
| 8,182,319 B2 | | 5/2012 | Ong | |
| 2002/0067277 A1 | | 6/2002 | Nishimura | |
| 2002/0094772 A1 | | 7/2002 | Gough | |
| 2004/0239198 A1 | * | 12/2004 | Horng | ...................... H02K 5/15 310/67 R |
| 2013/0294909 A1 | * | 11/2013 | Chang | ................... F04D 29/646 415/229 |
| 2014/0119960 A1 | * | 5/2014 | Aiello | ................... F04D 29/281 417/353 |
| 2019/0390864 A1 | * | 12/2019 | Lambert | .................. F24F 11/52 |
| 2022/0141995 A1 | * | 5/2022 | Dikken | .............. H05K 7/20172 361/679.48 |

* cited by examiner

*Primary Examiner* — J. T. Newton

(74) *Attorney, Agent, or Firm* — Prol Intellectual Property Law, PLLC; H. Kenneth Prol

(57) ABSTRACT

A carbon dioxide (CO2) minimizing refurbishable fan assembly for an information handling system may comprise a refurbishable motor assembly including a re-used bushing mechanically affixed to a re-used exterior housing and disposed through central openings of a re-used printed circuit board assembly and a re-used motor. A replaceable bushing assembly, including a replaceable bearing housed within a replaceable bushing to form a bearing aperture for receiving an impeller drive shaft of an impeller assembly, the re-usable motor for generating an electro-magnetic field for interacting with magnets on the impeller assembly to drive rotation of the impeller assembly when the aligned impeller drive shaft is disposed in a bearing aperture of the replaceable bushing assembly to reduce noise and wear on the impeller drive shaft and the replaceable bushing assembly.

14 Claims, 12 Drawing Sheets

200

210

237

230

220

SYSTEM AND METHOD FOR A REFURBISHABLE FAN ASSEMBLY

FIELD OF THE DISCLOSURE

The present disclosure generally relates to refurbishment of fan assemblies for information handling systems. More specifically, the present disclosure relates to a minimizing carbon dioxide (CO2) with refurbishable fan assembly that is designed for efficient re-use of a portion of the components of a fan assembly to minimize unnecessary manufacture and disposal of those parts that are still functional.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more fan assemblies for cooling of internal components of the information handling system, such as the processor, memory, or network interface device, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
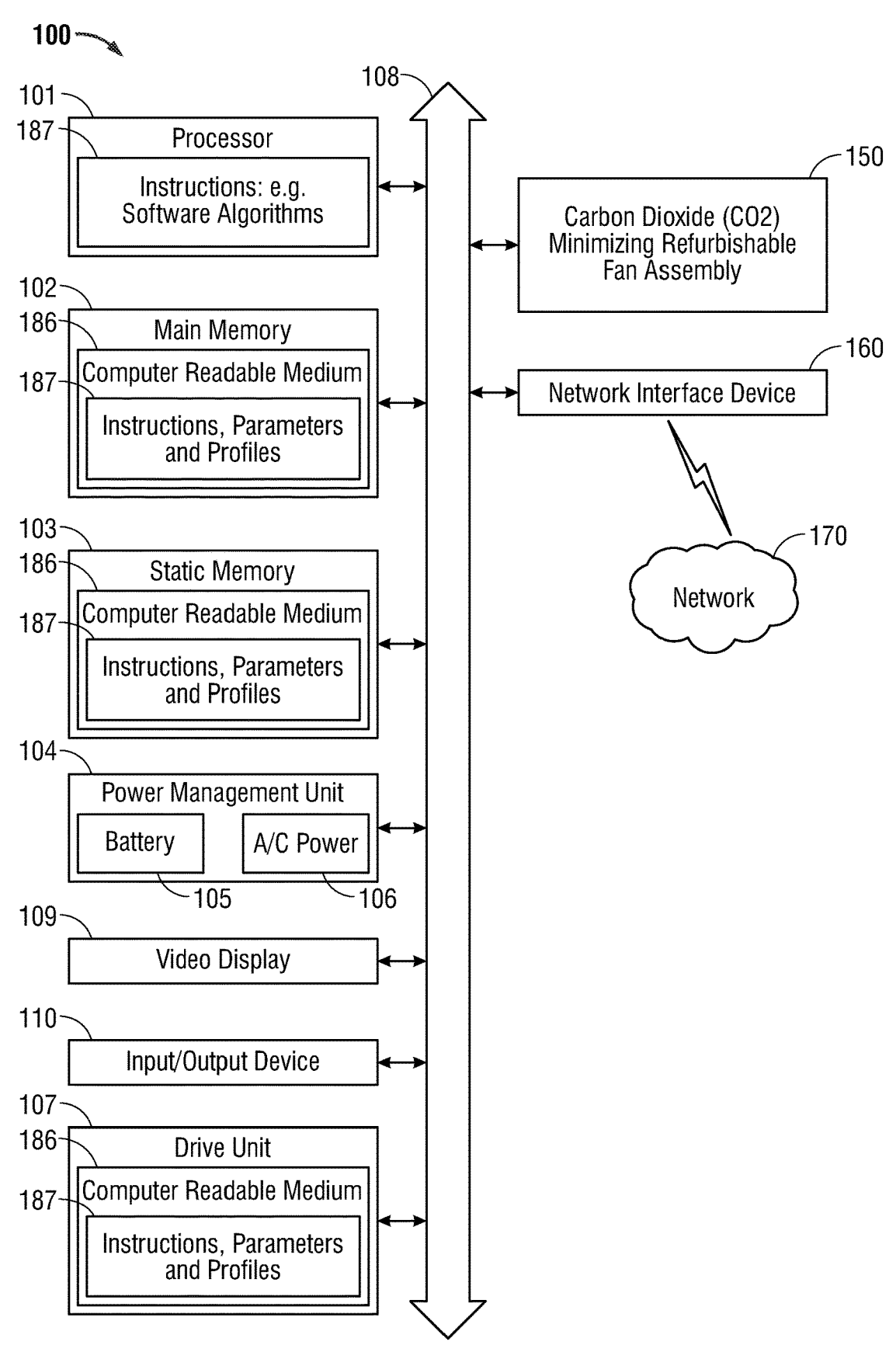
FIG. 1 is a block diagram illustrating an information handling system housing a refurbishable fan assembly according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. One way to minimize such GHG emissions, such as carbon dioxide (CO2) emissions is to increase the life span of devices or components, thereby reducing or delaying manufacture of at least a portion of replacement parts and disposal of those parts that may still be functional in a device assembly. The fan assembly of an information handling system, such as a notebook, laptop, or desktop computer, for example, may be routinely replaced entirely, despite one or more interior components of the fan assembly still being operational. Thus, a fan assembly for an impeller blower used with an information handling system is typically not refurbishable and must be replaced in its entirety. A subset of the interior components of a fan assembly, such as the interior shaft and the bearing are most likely to deteriorate more rapidly than the surrounding components. A solution is needed to enable efficient and effective replacement of only these subcomponents (e.g., shaft or bearing) when necessary, rather than replacing the entire fan assembly upon wear of these more rapidly deteriorating subcomponents.

The CO2 minimizing refurbishable fan assembly of embodiments of the present disclosure addresses this issue by making it possible to replace only the shaft or the bearing of another component that may wear more quickly of a fan assembly, while continuing to re-use the various other subcomponents of the fan assembly that may not wear out. For example, the CO2 minimizing refurbishable fan assembly in various embodiments described herein may include a refurbishable fan impeller assembly with a replacement shaft and a re-used impeller plate or impeller blade assembly. As another example, the CO2 minimizing refurbishable fan assembly in embodiments may include a refurbishable fan motor assembly that may use a dual-bushing assembly. In embodiments, such a dual-bushing assembly may include a bushing that may be worn more slowly than the bearing and may thus be re-used upon replacement of the bearing. The dual-bushing assembly may further include a bushing assembly that includes the bearing. Replacement of the bushing assembly, including replacement of the bearing may allow for re-use of the bushing, motor, and printed circuit board assembly (PCBA) of the motor assembly in embodiments described herein. Thus, use of the refurbishable fan impeller assembly or refurbishable fan motor assembly in embodiments described herein may allow for replacement of worn shafts and bearings, and reuse of still functional components such as the impeller blade, impeller plate, motor, PCBA, and bushing. The refurbishable fan assembly may have an efficient method to align and balance rotating fan components to make replacement of worn parts more efficient and easier than previous fan assemblies for fan blowers used in information handling systems. In such a way, the CO2 minimizing refurbishable fan assembly may decrease CO2 emitted during manufacture of new components and disposal of still-operable components of a fan assembly for an information handling system.

FIG. 1 illustrates an information handling system 100 according to several aspects of the present disclosure. In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions, the wireless network interface device 160, a static memory 103 or drive unit 107, a, a video display 109, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may further include a carbon dioxide (CO2) minimizing refurbishable fan assembly 150 in an embodiment. As described herein, the CO2 minimizing refurbishable fan assembly 150 may make it possible to replace only the shaft or the bearing of a fan assembly or another quickly worn component, while continuing to re-use the various other subcomponents of the refurbishable fan assembly 150. In such a way, the CO2 minimizing refurbishable fan assembly 150 may decrease CO2 emitted during manufacture of new components and reduce disposal of still-operable components of a fan assembly 150 for an information handling system 100.

The information handling system 100 may execute code instructions 187, via one or more hardware processing resources, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing an enterprise-wide CO2 emissions minimizing load-balancing system 180, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 170. Further, the instructions 187 may be transmitted or received over the network 170 via the network interface device 160. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the enterprise-wide CO2 emissions minimizing load-balancing system 180 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® Core class hardware processor, ARM® brand hardware processors, Qualcomm® Snapdragon hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2A:
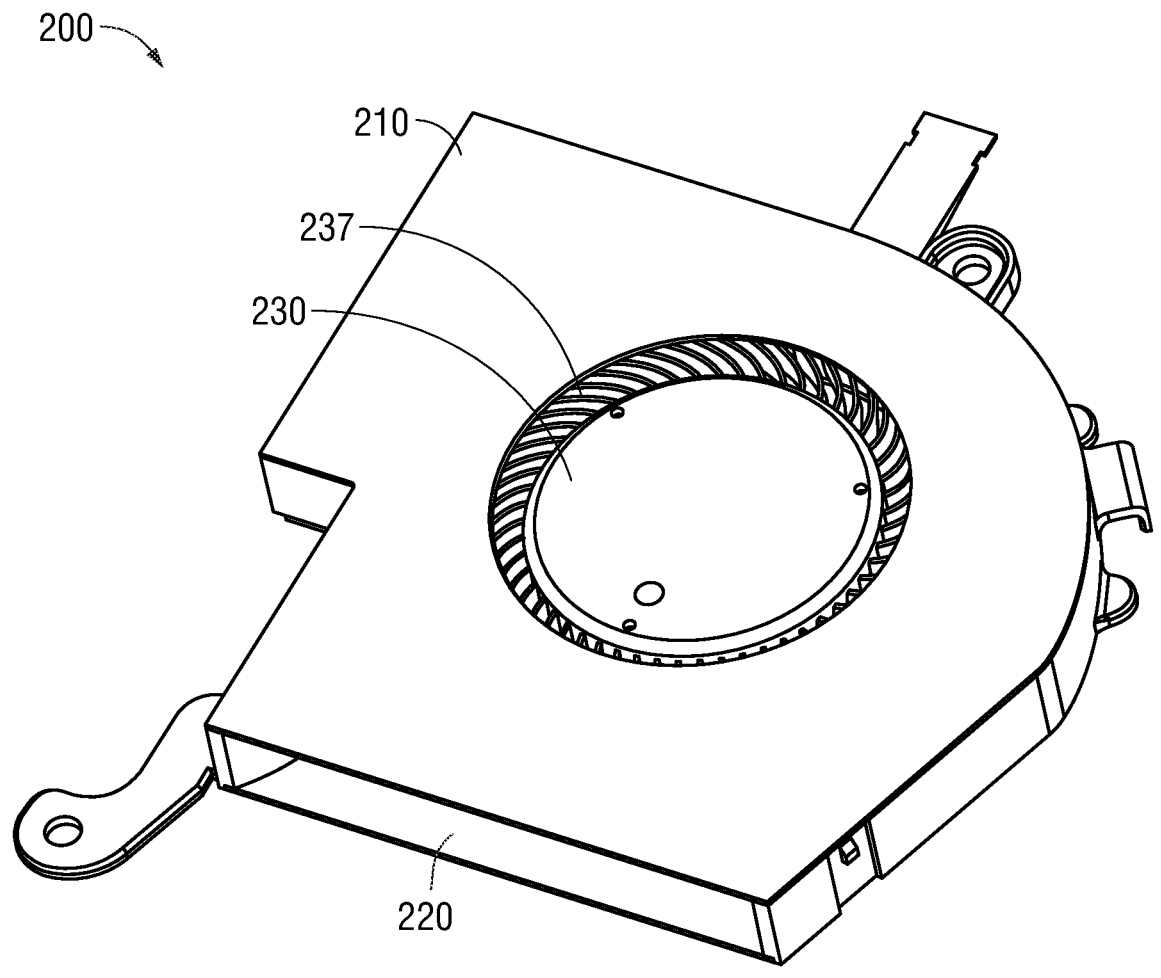
FIG. 2A is a graphical diagram illustrating a perspective view of a carbon dioxide (CO2) minimizing refurbishable fan assembly according to an embodiment of the present disclosure.

FIG. 2A is a graphical diagram illustrating a perspective view of a carbon dioxide ($CO_2$) minimizing refurbishable fan assembly for an information handling system according to an embodiment of the present disclosure. As described herein, the $CO_2$ minimizing refurbishable fan assembly 200 in an embodiment may make it possible to replace only the shaft or the bearing of a fan assembly 200, while continuing to re-use the various other subcomponents of the fan assembly. For example, as described in greater detail below, the $CO_2$ minimizing refurbishable fan assembly in various embodiments described herein may include a refurbishable fan impeller assembly 230 with a replacement shaft and a re-used impeller plate or impeller blade assembly 237. As another example, the $CO_2$ minimizing refurbishable fan assembly 200 in embodiments may include a refurbishable fan motor assembly (not shown), enclosed between an upper exterior dampening housing cover 210 and a lower exterior housing 220 that may use a dual-bushing assembly, allowing for case of bearing replacement and re-alignment and re-balancing of the refurbished impeller blade assembly 230 when re-used. Thus, use of the refurbishable fan impeller assembly 230 or refurbishable fan motor assembly in an embodiment may allow for replacement of worn shafts and bearings, and reuse of still functional components such as the impeller blade 237, impeller plate, motor, PCBA, and bushing. In such a way, the $CO_2$ minimizing refurbishable fan assembly 200 may decrease $CO_2$ emitted for manufacture of new components and disposal of still-operable components of a fan assembly 200 for an information handling system.

Figure 2B:
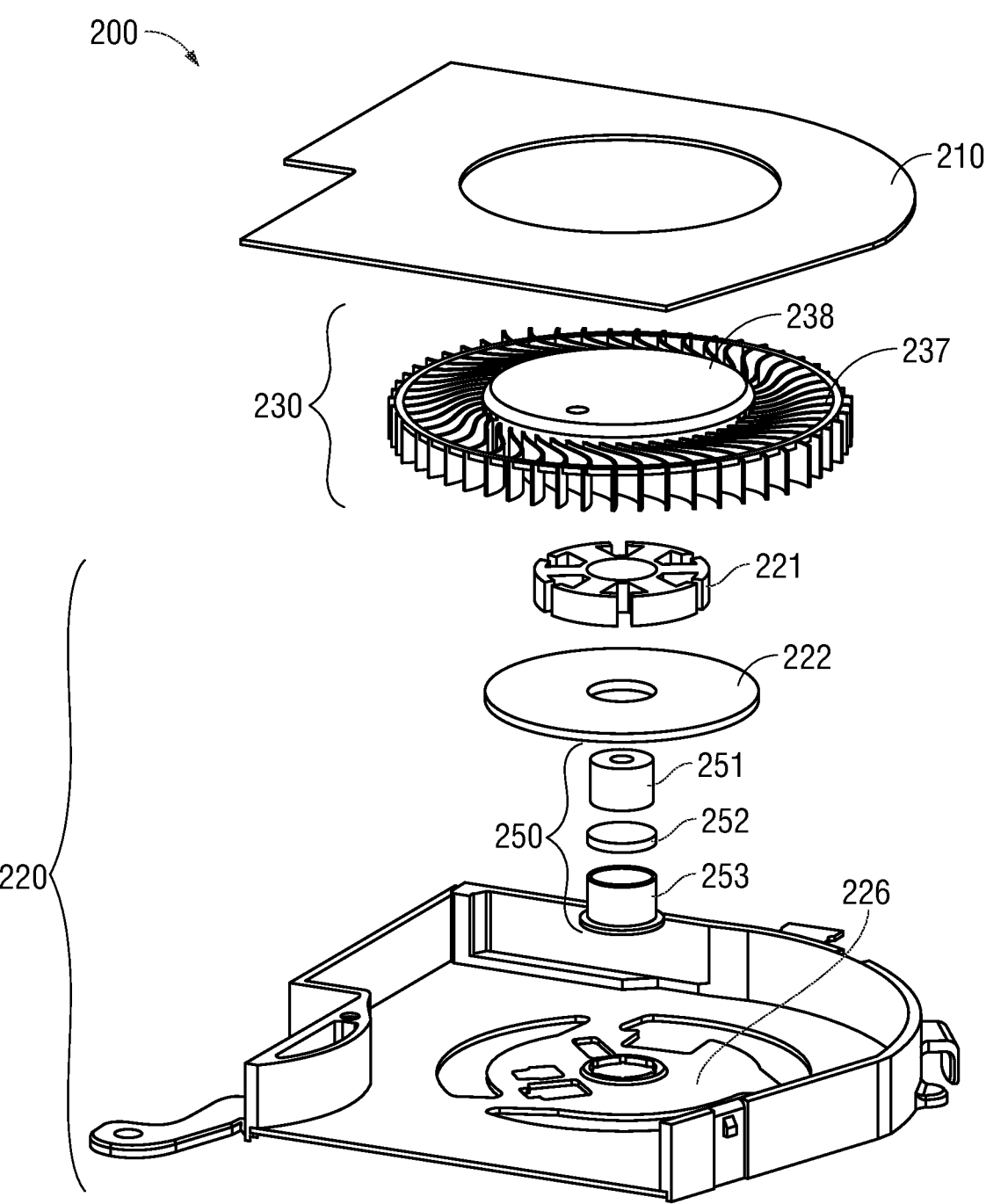
FIG. 2B is a graphical diagram illustrating an exploded perspective view of a CO2 minimizing refurbishable fan assembly according to an embodiment of the present disclosure.

FIG. 2B is a graphical diagram illustrating an exploded perspective view of several interior components of a carbon dioxide ($CO_2$) minimizing refurbishable fan assembly for an information handling system according to an embodiment of the present disclosure. The $CO_2$ minimizing refurbishable fan assembly 200 in an embodiment may comprise a dampening housing cover 210, an impeller assembly 230, and a motor assembly 220. In various embodiments described herein, the impeller assembly 230 may comprise a refurbishable fan impeller assembly that includes one or more replacement parts. In another aspect of various embodiments, the motor assembly 220 may comprise a refurbishable fan motor assembly that includes one or more replacement parts. Each of the impeller assembly 230 and the motor assembly 220 in an embodiment may comprise re-used components, even when refurbished. In such a way, the $CO_2$ minimizing refurbishable fan assembly 200 in an embodiment may allow for replacement of worn shafts, bearings 251 or bushings 253, which may degrade more quickly than surrounding components, and reuse of still functional components such as the impeller blade 237, impeller plate 238, motor 221, PCBA 222, and bushing 253.

In an embodiment, a refurbishable fan motor assembly 220 may include a re-used bushing 253 mechanically affixed to a re-used exterior housing 226 (e.g., as described in greater detail below), disposed through a re-used printed circuit board assembly (PCBA) 222 and a re-used motor 221. These components (e.g., 221, 222, and 226) may wear more slowly than the bearing 251, resulting in a need to replace the bearing 251, for example, before a need arises for replacement of these components (e.g., 221, 222, and 226). In order to allow for re-use of these components upon replacement of the bearing 251, the refurbishable fan motor assembly 220 may use a dual-bushing system that includes a re-used bushing 253 affixed to the housing 226, and a bushing assembly 250 inserted therewithin. The bushing assembly 250 in an embodiment may include a replacement bearing 251 housed within a replacement inner bushing 253, along with a sealant cap 252, as described in greater detail below. The replacement bushing assembly 250 in an embodiment may be disposed throughout an interior radial surface of the re-used bushing 253 affixed or mechanically attached to the re-used exterior housing 226. In such a way, the bushing assembly 250 may be replaced while reusing the exterior housing 226, the PCBA 222 and the motor 221. The refurbishable fan motor assembly 220 in an embodiment may then be operatively connected to the impeller assembly 230 and the dampening housing 210 (e.g., through insertion of a rotation shaft, as described below), to allow the motor assembly 220 to drive rotation of the impeller assembly 230.

Figure 3A:
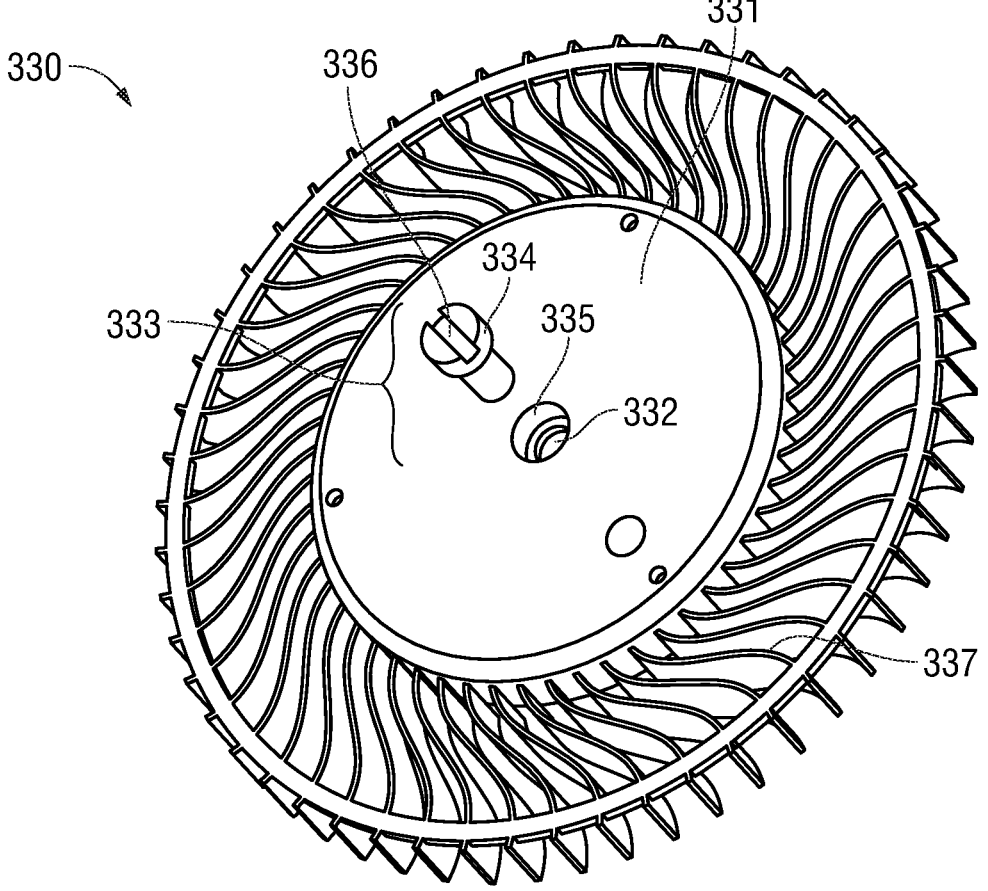
FIG. 3A is a graphical diagram illustrating a perspective view of a refurbishable fan impeller assembly including a replacement shaft according to an embodiment of the present disclosure.

FIG. 3A is a graphical diagram illustrating a perspective view of a refurbishable fan impeller assembly including a replacement shaft for an information handling system according to an embodiment of the present disclosure. In one example embodiment, a refurbishable fan impeller assembly 330 may include a replacement shaft 333. This may allow for replacement of the more quickly degraded rotation shaft 333 and re-use of surrounding components that do not wear as quickly as the shaft 333. For example, the refurbishable fan impeller assembly 330 in an example embodiment may include a re-used impeller plate 331 with impeller blades 337. The refurbishable fan impeller assembly 330 in an embodiment may include a replacement shaft 333 disposed through an impeller central opening 332 of a re-used impeller plate 331 mechanically affixed to re-used impeller blades 337 to operably connect the re-used impeller plate 331 to the motor assembly. This may allow the motor assembly to drive rotation of the re-used impeller blades 337 of the refurbishable fan impeller assembly 331. The replacement rotation shaft 333 in an embodiment may have a threaded exterior surface 334 in an embodiment, for operably connecting at least a portion of the shaft 333 to the impeller plate 331.

In an embodiment that includes a refurbishable fan motor assembly, the replacement shaft 333 may be inserted through a central opening of a replacement bushing assembly. The re-used impeller plate 331 in an embodiment may also include a threaded interior radial surface guide structure 335, forming a notch in impeller plate 331 that may act as a rib to guide insertion of the replacement shaft 333 through the motor central opening. Insertion of the shaft 333 within the interior radial surface 335 of the impeller plate 331 in such a way in an embodiment may position the shaft 333 with respect to the plate 331 to provide rotary impeller rotation of the impeller plate 331 and impeller blades 337 about shaft 333. In an embodiment, shaft 333 may have exterior threading 334 that applies counter-tension to the rotation of the impeller plate 331 such that rotation of the impeller plate 331 does not cause loosening or unscrewing of the shaft 333 from the interior radial surface guide structure aperture 335. Additionally, shaft 333 may include a slot in the surface exterior to the interior radial surface guide structure aperture 335 and opposite the motor for loosening or tightening of the shaft 333 within the interior radial surface 335 during replacement of the shaft 333. The interior radial surface guide structure aperture 335 with notch provides a guide for replacement shaft 333 during re-assembly to ensure the position of the replacement shaft 333 for balance to provide even rotation of the impeller plate 331 and blades 337. This reduces noise and wear on the refurbished impeller assembly. The alignment of the interior radial surface guide structure aperture 335 of the notch aligns the shaft 333 in any replacement bearings or bushings of the motor assembly.

Figure 3B:
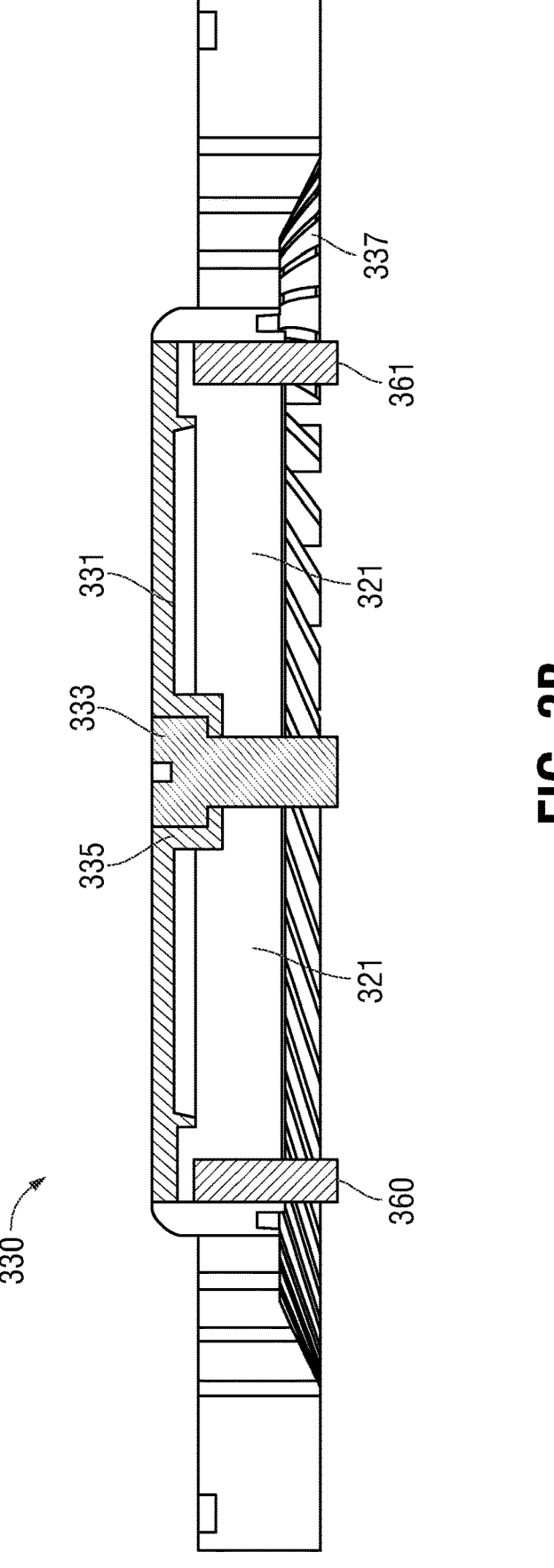
FIG. 3B is a graphical diagram illustrating a cut-out side view of an impeller assembly according to various aspects of the present disclosure.

FIG. 3B is a graphical diagram illustrating a cross-sectional side view of an impeller assembly for a CO2 minimizing refurbishable fan assembly according to various aspects of the present disclosure. The impeller assembly 330 in an embodiment may be mounted to a motor 321 which may generate an electro-magnetic field via a plurality of stationary magnets (e.g., 360 and 361), where magnet 360 has a polarity opposite that of magnet 361. This magnetic field may interact with one or more magnets mounted to the impeller assembly 330 (not shown, but discussed in greater detail below with respect to FIG. 4A) to drive rotation of the impeller assembly 330 with respect to the motor 321. The bottom side of notched interior radial surface guide structure aperture 335 positions shaft 333 before attaching impeller plate 331 with fastener screw to provide ease of balancing the rotating impeller. As described herein, insertion of the shaft 333 within the interior radial surface guide structure aperture 335 of the impeller plate 331 in an embodiment may position the shaft 333 with respect to the plate 331 to provide rotary impeller rotation of the impeller plate 331 and impeller blades 337 about shaft 333.

The impeller assembly 330 in an embodiment may be a refurbishable fan impeller assembly according to various embodiments described herein, that may include a re-used impeller assembly that incorporates one or more replaceable parts. The refurbishable impeller assembly 330 may be operably connected to a motor assembly (also either refurbishable or re-used) via the rotation shaft 333 in an embodiment and any bearings or bushings therein. As described below, the rotation shaft 333 in an embodiment may be inserted through a the PCBA central opening, the motor central opening, and an interior radius of a bushing assembly, such that the refurbishable fan motor assembly causes rotation of the re-used impeller blades 337 of the refurbishable fan impeller assembly. Shaft 333 may be replaced easily with the embodiments of the impeller assembly 330 since shaft 333 may wear out sooner than the impeller plate 331 and blades 337. For example, the shaft 333 may be inserted such that the motor (not shown) is situated directly beneath the impeller plate 331 in an embodiment.

A replacement shaft 333 in an embodiment may be disposed through an impeller central opening of an impeller plate 331 mechanically affixed to impeller blades 337. In such an embodiment, the replacement shaft 333 may be mechanically connected to the impeller plate 331 by screwing a threaded exterior surface of the replacement shaft 333 into a threaded interior surface of a central opening 332 within the impeller plate 331. In another embodiment, as described below, the shaft 333 may be mechanically affixed to a replacement impeller plate 331, which may be mechanically connected to the impeller blades 337. As described herein, shaft 333 may include a slot in the surface exterior to the notched interior radial surface guide structure aperture 335 and opposite the motor for loosening or tightening of the shaft 333 within the interior radial surface 335 during replacement of the shaft 333. The interior radial surface guide structure aperture 335 notch provides a guide for replacement shaft 333 during re-assembly to ensure the position of the replacement shaft 333 for balance and even rotation of the impeller plate 331 and blades 337 to reduce noise and wear on the refurbished impeller assembly. The alignment of the interior radial surface guide structure aperture 335 of the notch aligns the shaft 333 in any replacement bearings or bushings of the motor assembly.

Figure 4A:
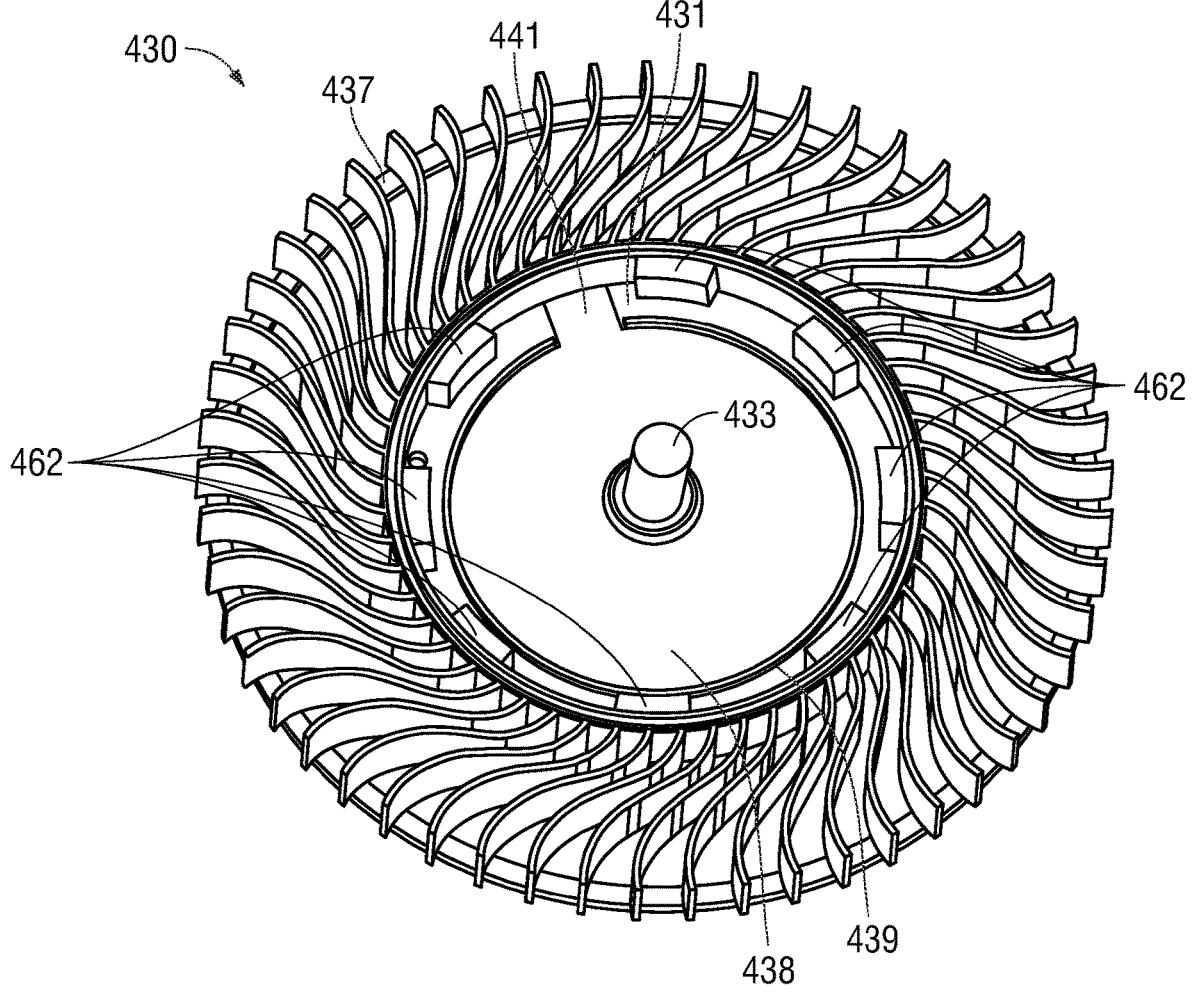
FIG. 4A is a graphical diagram illustrating a perspective view of a refurbishable fan impeller assembly including a replacement shaft plate according to an embodiment of the present disclosure.

FIG. 4A is a graphical diagram illustrating a perspective view of a refurbishable fan impeller assembly of a carbon dioxide (CO2) minimizing refurbishable fan assembly including a replacement impeller plate according to an embodiment of the present disclosure. As described herein, the impeller assembly 430 in an embodiment may be mounted to a motor (not shown, but described in greater detail above with respect to FIG. 3B) which may generate an electro-magnetic field via a plurality of stationary magnets (not shown, but described in greater detail herein). This magnetic field may interact with one or more magnets 462 mounted to the impeller assembly 430 to drive rotation of the impeller assembly 430 with respect to the shaft 433.

A refurbishable fan impeller assembly 430 in an embodiment may include an impeller plate 431 with an adhesively affixed impeller shaft 433 and shaft plate 438 inserted into an interior shaft plate guide wall 439 of a re-used blade assembly 437 and impeller plate 431. The impeller plate 431 may include plural permanent magnets 462 of opposing polarities across the impeller plate 431 to interact with the brushless fan motor (not shown) to drive the impeller plate as an outrunner brushless direct current (DC) motor. The replacement shaft plate 438 with shaft 433 may be affixed to the re-used blade assembly 437 and impeller plate 431 in an embodiment via an adhesive tape layer 441, such as a two-sided tape layer as also described in greater detail below with respect to FIG. 4B. The impeller shaft 433 in an embodiment may be laser welded to the replacement shaft plate 431 in an example embodiment. Shaft 433 in an embodiment is aligned via placement of shaft plate 431 with interior shaft plate guide wall 439 for balance, ease of refurbishment, reduced noise, and wear when refurbished.

Figure 4B:
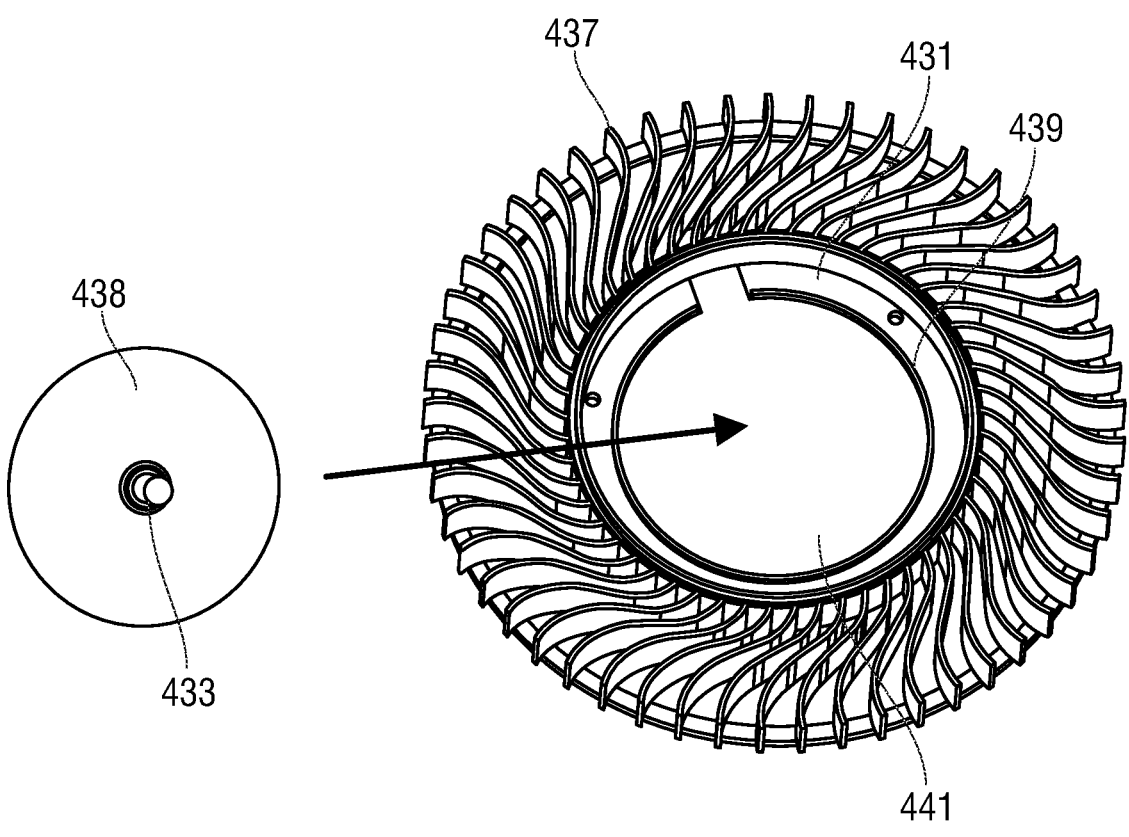
FIG. 4B is a graphical diagram illustrating a perspective view of a replacement shaft plate for insertion within a re-used impeller blade assembly according to an embodiment of the present disclosure.

FIG. 4B is a graphical diagram illustrating a perspective view of a replacement shaft plate for insertion within a re-used impeller blade assembly of a refurbishable fan impeller assembly according to an embodiment of the present disclosure. The refurbishable fan impeller assembly 430 in an embodiment may be formed through insertion of a replacement shaft plate 438, which includes a replacement rotation shaft 433 into a re-used impeller blade assembly on a re-used impeller plate 431. In an embodiment, the re-used impeller blade assembly may include a re-used blade assembly 437 and a re-used impeller plate 431 that further includes an interior shaft plate guide wall 439. An adhesive tape layer 441 may be affixed to the exterior surface of the re-used blade assembly 437 opposite the insertion point for the replacement shaft plate 438 in an embodiment. The replacement shaft plate 438 may then be inserted within the interior shaft plate guide wall 439 and adhesively joined to the re-used blade assembly 437 via common contact with the adhesive tape layer 441. The interior shaft plate guide wall 439 may provide a guide during re-assembly to ensure the position of the replacement shaft plate 438 for balance to provide even rotation of the re-used impeller plate 431 and blade assembly 437 to reduce noise and wear on the refurbished impeller assembly.

Figure 5A:
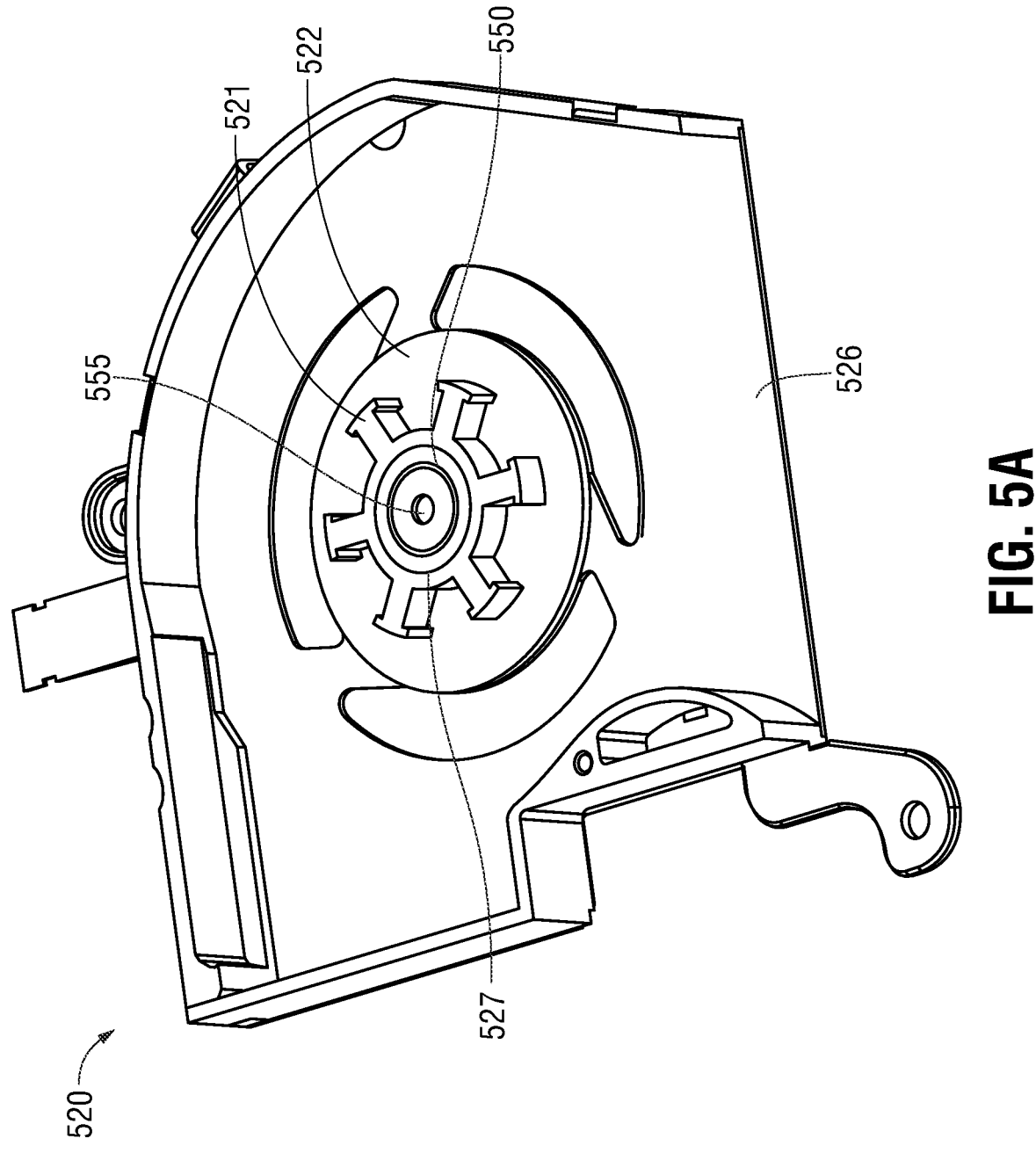
FIG. 5A is a graphical diagram illustrating a perspective view of a refurbishable fan motor assembly according to an embodiment of the present disclosure.

FIG. 5A is a graphical diagram illustrating a perspective view of a refurbishable fan motor assembly for a carbon dioxide (CO2) minimizing refurbishable fan assembly according to an embodiment of the present disclosure. In order to allow for re-use of some components upon replacement of the quickly-worn components such as the bearing assembly 551 in a motor assembly 520 in an embodiment, the refurbishable fan motor assembly 520 may use a dual-bushing system that includes a re-used bushing 527 affixed to the housing 526, and a bushing assembly 550 having a second replaceable interior bushing 553 inserted therewithin. The bushing assembly 550 in an embodiment may include a replacement bearing (not shown), as described in greater detail below. The replacement bushing assembly 550 in an embodiment may be disposed at an interior radial surface of the re-used bushing 527 affixed or mechanically attached to the re-used exterior housing 526. The bushing 527 may then be inserted within a central opening of the re-used printed circuit board assembly (PCBA) 522 and the re-used motor 521 in an embodiment. The rotational shaft (e.g., as described above) may be inserted within the interior opening 555 of the bushing assembly 550. As described herein, an impeller assembly (not shown) in an embodiment may be mounted to the motor 521 which may be a pulsed out-runner magnetic drive motor that generates an electromagnetic field via a plurality of stationary magnets (not shown, but described in greater detail above with respect to FIG. 3B). This magnetic field may interact with one or more magnets (e.g., 462 as shown in FIG. 4A) mounted to the impeller assembly (not shown) to drive rotation of the impeller assembly and a shaft (not shown) of the impeller assembly inserted within the interior opening 555. In such a way, the dual-bushing system may allow for replacement of the quickly-worn parts such as the bearing 551 or replaceable bushing 553 within the bushing assembly 550 and re-use of the less-worn bushing 527, exterior bushing 527, exterior housing 526, PCBA 522, and motor 521. The interior opening 555 may provide a guide during re-assembly to ensure the position of the shaft for the impeller assembly (not shown) for balance and even rotation of a re-used impeller assembly to reduce noise and wear on the refurbished impeller assembly.

Figure 5B:
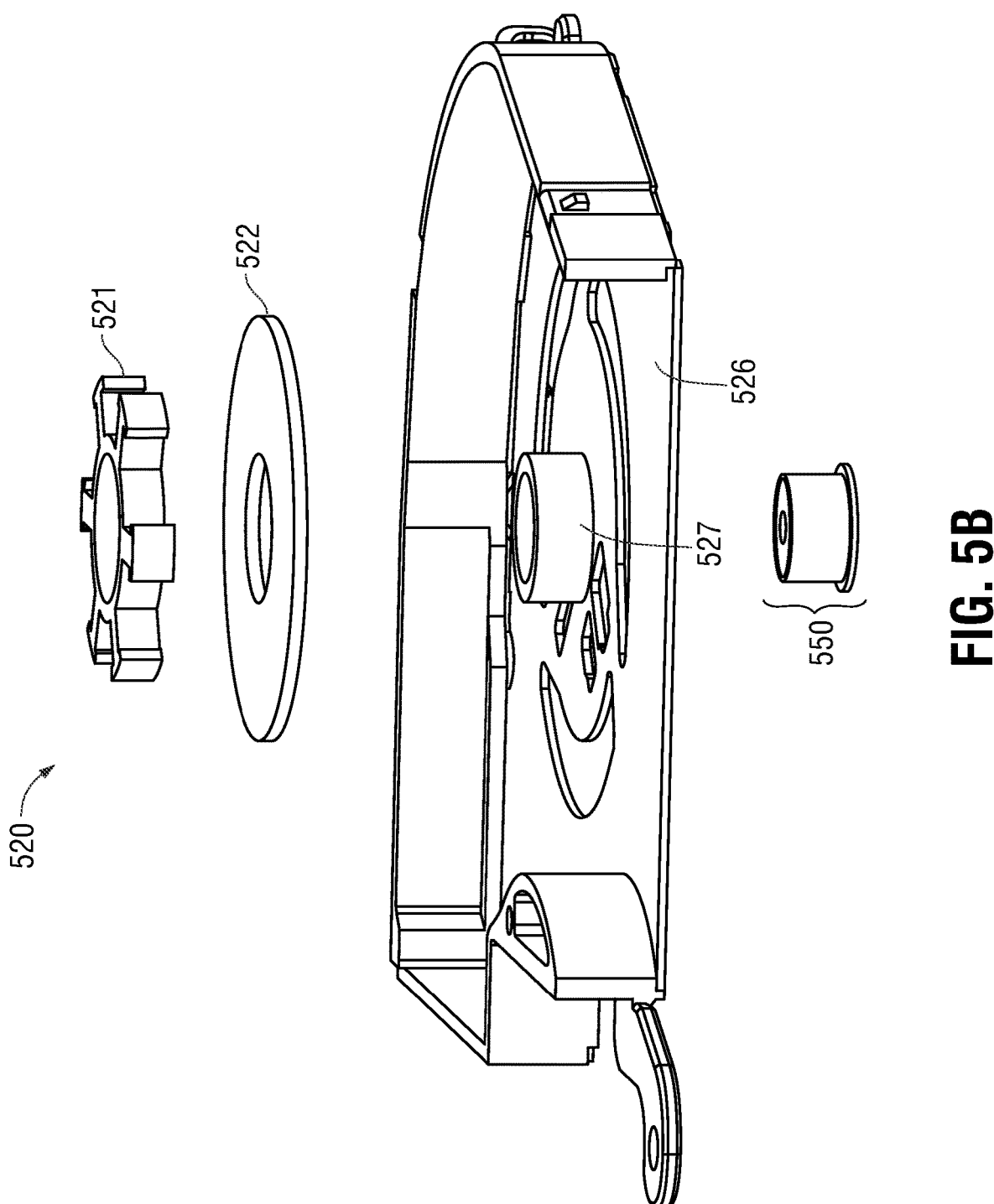
FIG. 5B is a graphical diagram illustrating an exploded perspective view of refurbishable fan motor assembly including a replacement bushing assembly according to an embodiment of the present disclosure.

FIG. 5B is a graphical diagram illustrating an exploded perspective view of refurbishable fan motor assembly including a replacement bushing assembly according to an embodiment of the present disclosure. To form the refurbishable fan motor assembly 520 in an embodiment, a bushing assembly 550 that includes a replacement bearing inside may be inserted through a central opening of a re-used bushing 527 that is mechanically attached to a re-used exterior housing 526. In an embodiment, the re-used bushing 527 may then be inserted through an aperture in the re-used printed circuit board assembly 522 and the motor 521. In an example embodiment, the re-used bushing 527 may be riveted or otherwise fastened to the re-used exterior housing 526. In some embodiments, the exterior surface of the bushing assembly 550 and the interior surface of the re-used bushing 527 may be threaded. In such an embodiment, the replacement bushing assembly 550 in such an embodiment may be mechanically attached to the re-used bushing 527 by screwing the replacement bushing assembly 550 into the re-used bushing 527. In other embodiments, the bushing assembly 550 may be set into the bushing 527 with fasteners to operatively couple the two.

Figure 5C:
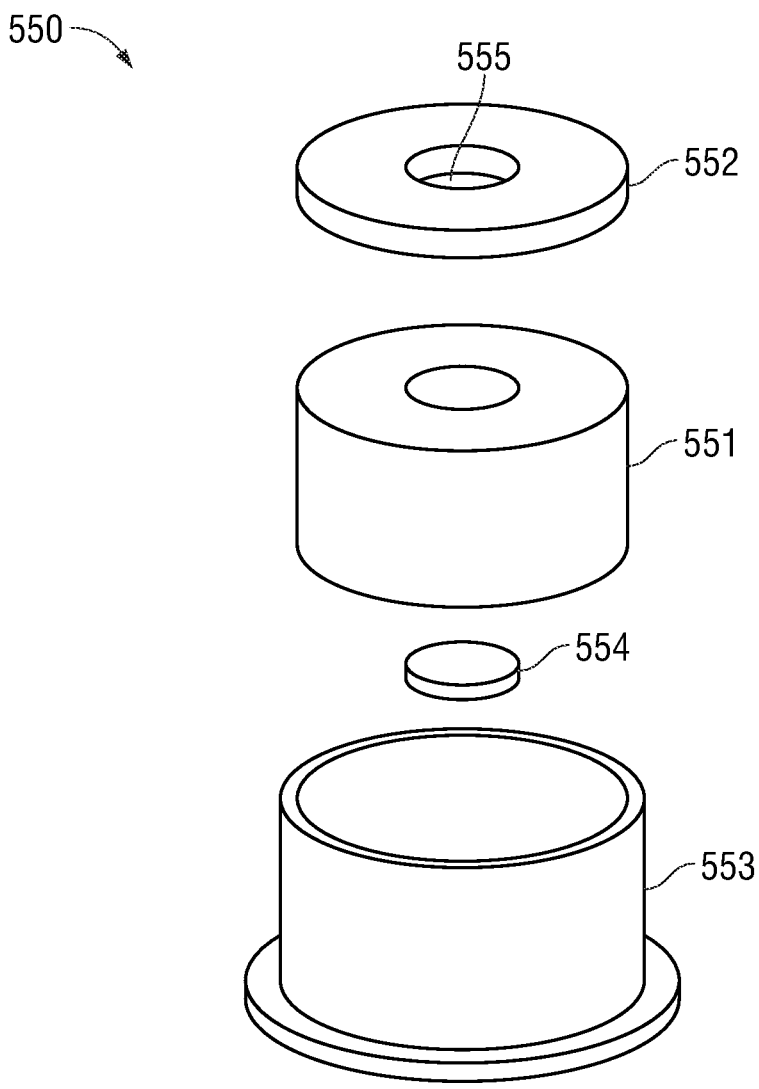
FIG. 5C is a graphical diagram illustrating an exploded perspective view of a replacement bushing assembly including a replacement bearing according to an embodiment of the present disclosure.

FIG. 5C is a graphical diagram illustrating an exploded perspective view of a replacement bushing assembly for a refurbishable fan motor assembly including a replacement bearing according to an embodiment of the present disclosure. A replaceable bushing assembly 550 in an embodiment may include a replacement bearing 551 housed within a replaceable inner bushing 553. In an embodiment, the replacement bushing assembly 550 may also include a sealant cap 552 and a sealant pad 554 situated on opposite ends of the bearing 551 to enclose fluid within the replacement bearing 551. In an embodiment, the replacement bearing 551 may be comprised of a variety of different materials, including stainless steel, plastic, or a magnesium housing.

Figure 5D:
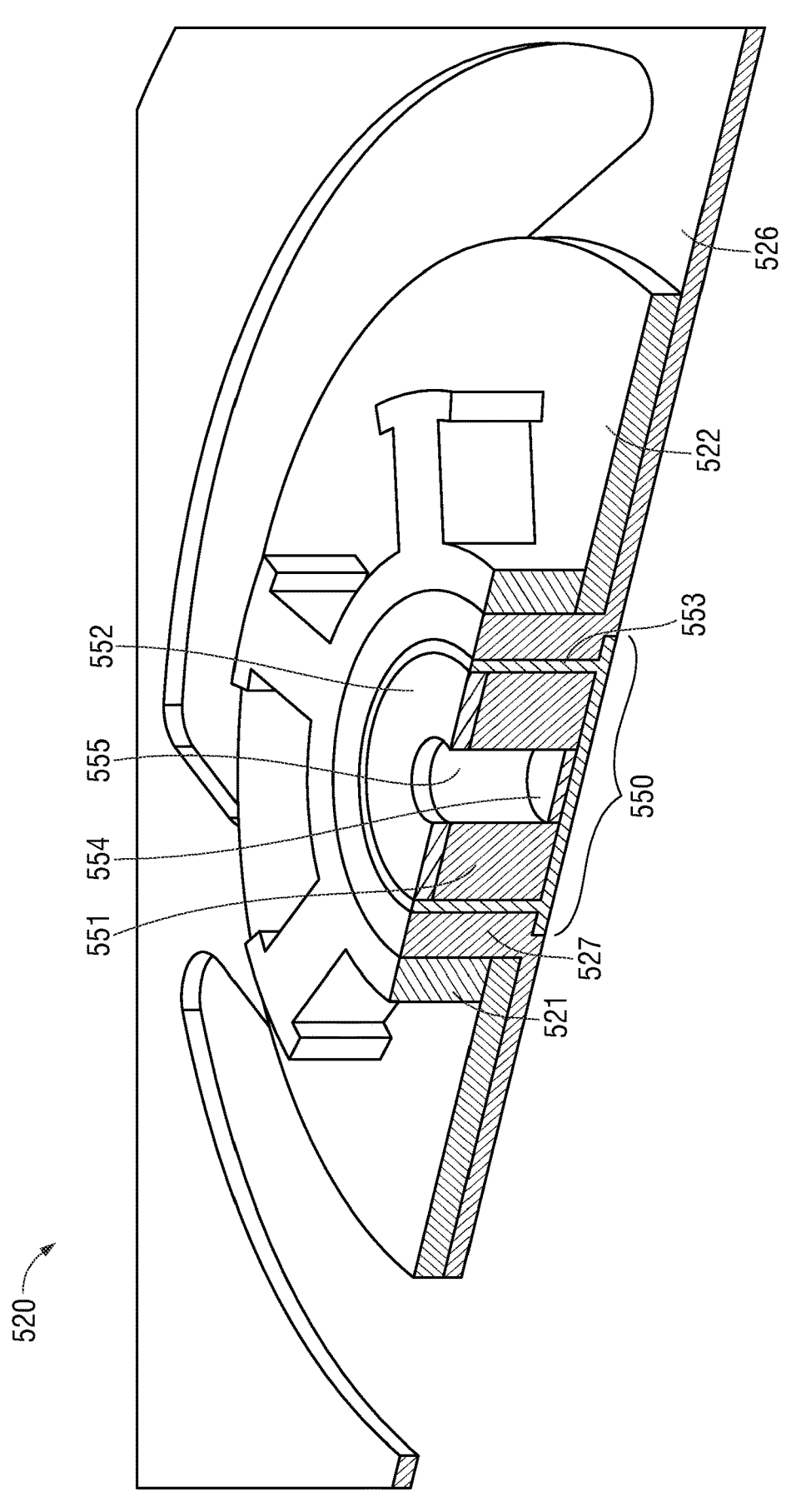
FIG. 5D is a graphical diagram illustrating a cut-out perspective view of refurbishable fan motor assembly including a replacement bushing assembly according to an embodiment of the present disclosure.

FIG. 5D is a graphical diagram illustrating a cut-out perspective view of refurbishable fan motor assembly including a replaceable bushing assembly and re-used bushing, motor, and printed circuit board assembly (PCBA) according to an embodiment of the present disclosure. The replaceable bushing 553 in an embodiment may house the replaceable bearing 551, sealant cap 552, and sealant pad 554. The replaceable bushing assembly 550 forms a bearing aperture 555 for receiving the impeller drive shaft of the impeller assembly discussed above. In an embodiment, the replaceable bushing 553 may be inserted within an interior opening of the re-used bushing 527. In some embodiments, the replaceable bushing 553 may be screwed into the re-used bushing 527. The re-used bushing 527 in an embodiment may be mechanically joined to the re-used exterior housing 526 (e.g., via riveting or welding). The re-used printed circuit board assembly 522 may then be situated atop the re-used exterior housing 526, with the re-used bushing 527 disposed within a central opening of the re-used PCBA 522. The re-used motor 521 may be situated atop the re-used PCBA 522, with the re-used bushing 527 disposed within a central opening of the re-used motor 521. In such a way, the embodiments described with respect to FIGS. 3A-4B may operate to align and balance the rotation drive shaft of an impeller assembly with respect to an out-runner brushless DC motor for balance and case of re-assembly following refurbishment through replacement of one or more interior components. Balance of the drive shaft in such a way with respect to the impeller assembly and the motor may decrease noise and wear on the refurbished impeller blower as well.

Figure 6:
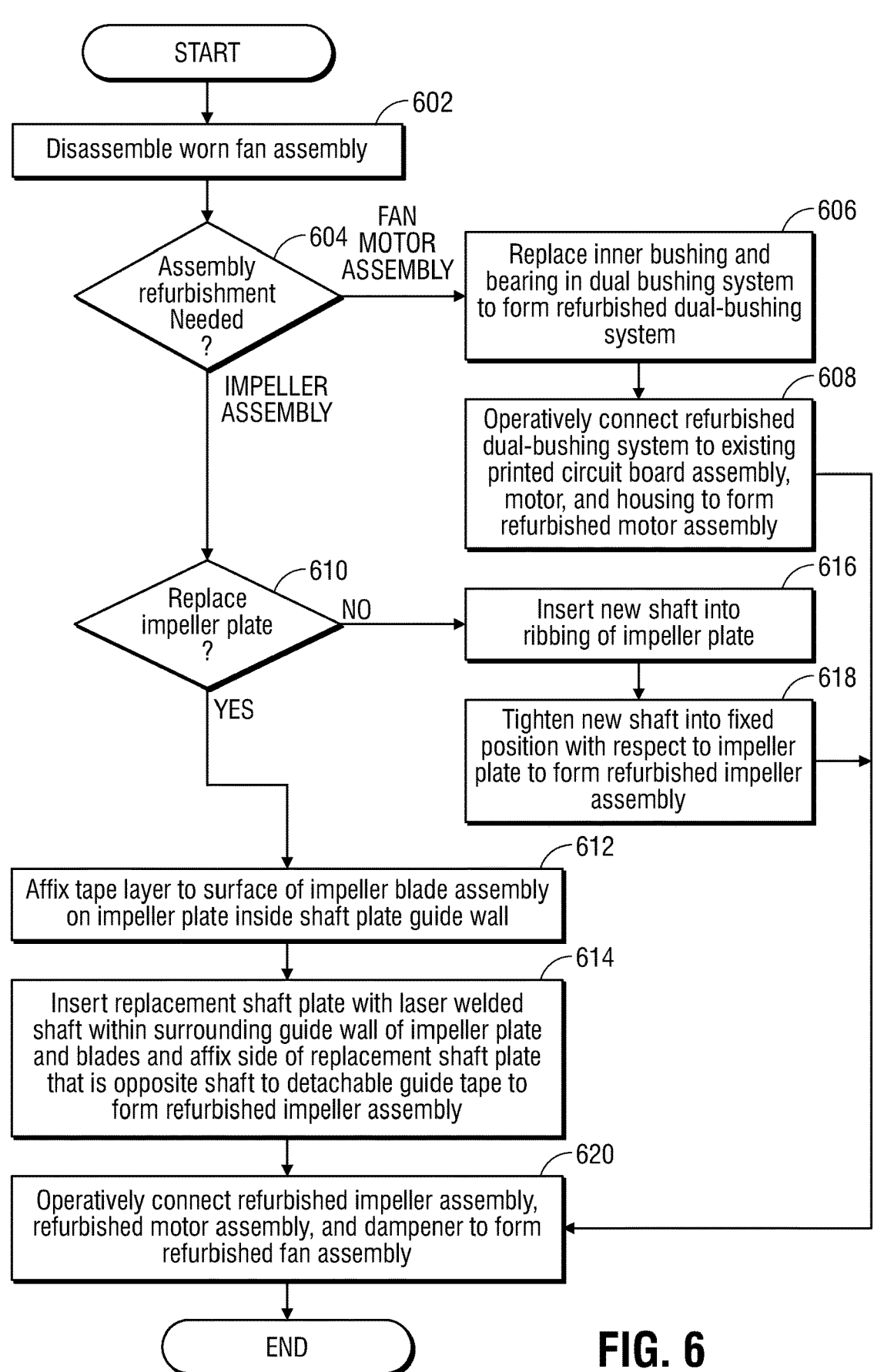
FIG. 6 is a flow diagram illustrating a method of refurbishing re-used components of a refurbishable fan assembly for an information handling system to minimize CO2 emissions according to an embodiment of the present disclosure.

FIG. 6 is a flow diagram illustrating a method of refurbishing re-used components of a fan assembly for an information handling system to minimize carbon dioxide (CO2) emissions due to manufacture and disposal of various components of the fan assembly according to an embodiment of the present disclosure. As described herein, the CO2 minimizing refurbishable fan assembly in an embodiment may make it possible to replace only the shaft, bearing, or other components subject to high wear and tear of a fan assembly, while continuing to re-use the various other subcomponents of the fan assembly. For example, as described in greater detail below, the CO2 minimizing refurbishable fan assembly in various embodiments described herein may include a refurbishable fan impeller assembly with a replaceable shaft and a re-used impeller plate or impeller blade assembly. As another example, the CO2 minimizing refurbishable fan assembly in embodiments may include a refurbishable fan motor assembly that may use a dual-bushing assembly, allowing for case of bearing replacement. Thus, use of the refurbishable fan impeller assembly or refurbishable fan motor assembly in an embodiment may allow for replacement of worn shafts and bearings, and reuse of still functional components such as the impeller blade, impeller plate, motor, PCBA, and bushing with systems and structures to facilitate rebuilding the fan assembly with aligned new components and ease of replacing worn components. FIG. 6 illustrates a method for refurbishing the fan assembly while replacing a minimally required number of worn components and reusing components that are still operationally functional.

At block 602, a worn fan assembly may be disassembled. As described herein, certain components of the fan assembly for an information handling system may wear more quickly than others, such as the bearing and rotational shaft. Re-use of the other components, rather than replacement of the entire fan assembly, may decrease CO2 emissions due to unnecessary manufacturing and disposal of interior components. Upon disassembly of the worn fan assembly in an embodiment, it may be determined which of the interior components actually require replacement.

It may be determined at block 604 which assembly requires replacement in an embodiment. For example, one or more portions of the motor assembly or of the impeller assembly may require replacement. More specifically, the rotation shaft of the impeller assembly or the bearing of the motor assembly may require replacement in various embodiments described herein. If the motor assembly requires refurbishment, including replacement of the bearing, the method may proceed to block 606 for refurbishment of the motor assembly. If the impeller assembly requires refurbishment, including replacement of the rotator shaft, the method may proceed to block 610 to determine the type of impeller plate that is incorporated within the impeller assembly in need of refurbishment, which may further dictate a later method of refurbishing the impeller assembly.

At block 606, in an embodiment in which the motor assembly requires refurbishment, the inner bushing assembly of a dual-bushing system may be replaced. For example, in an embodiment described with respect to FIG. 5A, in order to allow for re-use of some components upon replacement of the quickly-worn bearing of a motor assembly 520 in an embodiment, the refurbishable fan motor assembly 520 may use a dual-bushing system that includes a re-used bushing 527 affixed to the housing 526, and a bushing assembly 550 inserted therewithin. The bushing assembly 550 in an embodiment may include a replacement bearing and replaceable inner bushing, and it may be disposed in an interior radial surface of the re-used bushing 527 that is affixed or mechanically attached to the re-used exterior housing 526. In such a way, the dual-bushing system may allow for replacement of the quickly-worn bearing within the bushing assembly 550 and re-use of the less-worn re-used bushing 527.

The refurbishable fan dual-bushing system may then be operatively connected to the existing printed circuit board assembly (PCBA), existing motor, and existing exterior housing to form a refurbishable fan motor assembly in an embodiment at block 608. For example, the bushing 527 may be inserted within a central opening of the re-used PCBA 522 and the re-used motor 521 in an embodiment. In such a way, the dual-bushing system may allow for replacement of the quickly-worn bearing within the bushing assembly 550 and re-use of the less-worn bushing 527, exterior housing 526, PCBA 522, and motor 521. The method may then proceed to block 620 for joining the refurbishable fan motor assembly with a refurbishable fan or re-used impeller assembly.

At block 610, in an embodiment in which the impeller assembly requires refurbishment, it may be determined whether the impeller plate requires replacement. As described herein, the rotational shaft of the impeller assembly is the most likely component to require replacement, as it wears more quickly than surrounding components. In some embodiments described herein, such as with respect to FIG. 3A, the rotational shaft 333 may be removable with respect to the impeller plate 331. More specifically, the rotational shaft 333 may be unscrewed from the impeller plate 331 and from a notched alignment rib interior radial surface guide structure aperture 335. The shaft 333 may be removable from the impeller plate 331 with notch 336 to unscrew shaft 333. In an embodiment, shaft 333 may have exterior threading that applies counter-tension to the rotation of the impeller plate 331 such that rotation of the impeller plate 331 does not cause loosening or unscrewing of the shaft 333 from the interior radial surface 335. When the shaft 333 is removed from the impeller plate 331 and notched alignment rib interior radial surface guide structure aperture 335, the method may proceed to block 616 for replacement of the shaft 333 alone.

In other embodiments, the rotational shaft, such as described with reference to FIG. 4A, the rotational shaft 443 may be mechanically affixed (e.g., welded) to a shaft plate 438 that is adhesively affixed to the impeller plate 441, such that replacement of the shaft 443 may also require replacement of the shaft plate 438. The rotational shaft 433 and shaft plate 438 may be removeable with respect to the impeller plate 441, so the replacement of the impeller plate 441 may be unnecessary. If the rotational shaft 435 is removeable with the shaft plate 438, replacement of the shaft plate 438 may be necessary and the method may proceed to block 612 for replacement of the shaft plate 438 and shaft 433.

An adhesive tape layer 441 may be affixed to the surface of the impeller blade assembly that is exterior to the fan assembly 430 at block 612. For example, in an embodiment described with reference to FIG. 4B, an adhesive tape layer 441 may be affixed to the exterior surface of the re-used blade assembly 437 and the impeller plate 431 within interior shaft plate guide wall 439 for the replacement shaft plate 438 in an embodiment. A replacement shaft plate 438 with shaft 433 may be joined to the re-used blade assembly 437 and impeller plate 431 via common contact with the adhesive tape layer 441, as described in greater detail herein. This automatically aligns the shaft 433 with respect to the bushing assembly and permanent magnets 462 of the impeller plate 431 with respect to the fan motor.

At block 614, a replacement shaft plate 438 with a mechanically attached rotational shaft 433 may be inserted within an impeller blade assembly on impeller plate 431 inside guide wall 439 and adhered to tape layer to form a refurbishable fan impeller assembly in an embodiment. For example, the refurbishable fan impeller assembly 430 in an embodiment may be formed through insertion of a replacement shaft plate 438, which includes a replacement rotation shaft 433 into a re-used impeller plate 431 and blade assembly 437. In an embodiment, the re-used impeller blade assembly 430 may include an interior shaft plate guide wall 439. The replacement shaft plate 438 may be affixed to the re-used impeller plate 431 of the blade assembly 430 in an embodiment via an adhesive tape layer 441. In such a way, the refurbishable fan impeller assembly in an embodiment may include a replacement shaft and replace shaft plate 438 and continued use of an existing impeller blade assembly 437 and impeller plate 431. The method may then proceed to block 620 for joining a re-used or refurbishable fan motor assembly with the refurbishable fan impeller assembly 430.

In an embodiment in which replacement of the shaft plate is unnecessary, a new shaft may be inserted into a notched alignment rib interior radial surface guide structure aperture 335 of the existing impeller plate 331 at block 616. For example, in an embodiment described with reference to FIG. 3A, a refurbishable fan impeller assembly 330 may include a replacement shaft 333 to allow for replacement of the more quickly degraded rotation shaft 333 and re-use of surrounding components that do not wear as quickly as the shaft 333. The refurbishable fan impeller assembly 330 in an example embodiment may include a re-used impeller plate 331 and re-used impeller blades 337. The refurbishable fan impeller assembly 330 in an embodiment may include a replacement shaft 333 disposed through an impeller central opening 332 in a notched alignment rib interior radial surface guide structure aperture 335 of a re-used impeller plate 331 that is mechanically affixed to re-used impeller blades 337.

The replacement shaft 333 in an embodiment may be fixed into position with respect to the impeller plate 331 and aligned via the notched alignment rib interior radial surface guide structure aperture 335 to form a refurbishable fan impeller assembly at block 618. For example, the replacement rotation shaft 333 in an embodiment may have a threaded exterior surface in an embodiment, for operably connecting at least a portion of the shaft 333 to the impeller plate 331. In an embodiment, shaft 333 may have exterior threading that applies counter-tension to the rotation of the impeller plate 331 such that rotation of the impeller plate 331 does not cause loosening or unscrewing of the shaft 333 from the interior radial surface guide structure aperture 335. The re-used impeller plate 331 in an embodiment may also include a threaded notched alignment rib interior radial surface guide structure aperture 335 that may act as a rib to further guide insertion of the replacement shaft 333 through the motor central opening and align the shaft 333 for assembly with a re-used or refurbished motor assembly. The rotation shaft 333 may then be screwed into the impeller plate 331. The method may then proceed to block 620 for joining a re-used or refurbishable fan motor assembly with the refurbishable fan impeller assembly.

At block 620, a re-used or refurbishable fan motor assembly may be joined with a refurbishable fan or re-used impeller assembly to form a CO2 minimizing refurbishable fan assembly for an information handling system in an embodiment. For example, in an embodiment described with reference to FIG. 3B, the impeller assembly 330, which may be a refurbishable fan impeller assembly or may be a re-used impeller assembly may be operably connected to a motor assembly (also either refurbishable fan or re-used) via the rotation shaft 333 in an embodiment. The rotation shaft 333 in an embodiment may be inserted through a PCBA central opening, the motor central opening, and an interior radius of the replacement bushing assembly of the motor assembly, such that the refurbishable fan motor assembly causes rotation of the re-used impeller blades of the refurbishable fan impeller assembly when the motor rotates the impeller plate 331 with permanent magnets affixed thereto. For example, the shaft 333 may be inserted such that the motor is situated directly beneath the impeller plate 331 to interact with the permanent magnets thereon to cause electromagnetic force to rotate the permanent magnets and, thus, the impeller plate 331 in an embodiment.

As another example, in an embodiment described with reference to FIG. 4A, placement of shaft plate 431 within interior shaft plate guide wall 439 may ensure aligned insertion of the shaft 433 within the re-used blade assembly 437 and impeller plate 431 for balance, case of refurbishment, reduced noise, and wear when refurbished. The impeller shaft 433 may be laser welded to the replacement shaft plate 431 in an example embodiment. The interior shaft plate guide wall 439 may provide a guide during re-assembly to ensure the position of the replacement shaft plate 438 for balance and even rotation of the re-used impeller plate 431 and blade assembly 437 to reduce noise and wear on the refurbished impeller assembly.

In another example embodiment described with respect to FIG. 5B, the rotational shaft (e.g., as described above) may be inserted within the interior opening of the bushing assembly 550. The shaft may then be placed in the bearing and the motor 521 may rotate permanent magnets attached to the impeller plate such that the motor causes rotation of the impeller blades affixed to the impeller plate as an out-runner magnetic drive motor. In such a way, the CO2 minimizing refurbishable fan assembly may facilitate refurbishment of only worn parts and decrease CO2 emitted for manufacture of new components and disposal of still-operable components of a fan assembly for an information handling system. The method may then end.

The blocks of the flow diagram of FIG. 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A carbon dioxide (CO2) minimizing refurbishable fan assembly for an information handling system comprising:
   an impeller assembly and a refurbishable motor assembly;

the refurbishable motor assembly including a re-used bushing mechanically affixed to a re-used exterior housing and a re-used out-runner brushless direct current (DC) motor;

a replaceable bushing assembly, including a replaceable bearing housed within a replaceable bushing to form a bearing aperture for receiving an impeller drive shaft of the impeller assembly;

the re-used out-runner brushless DC motor including a plurality of electro-magnets generating varying electromagnetic fields to magnetically interact with a plurality of impeller plate magnets mechanically affixed to the impeller assembly for driving rotation of the impeller drive shaft within the bearing aperture;

the replaceable bushing assembly disposed in an interior radial surface of the re-used bushing and mechanically attached to the re-used exterior housing; and the impeller assembly including an impeller plate with a interior radial surface guide structure aperture formed through the impeller plate for guiding insertion of the impeller drive shaft into a bearing aperture in the replaceable bushing assembly to balance rotation and reduce noise and wear on the impeller drive shaft and the replaceable bushing assembly.

2. The refurbishable fan assembly of claim 1, wherein the replacement bushing assembly includes a sealant cap and a sealant pad enclosing fluid within the replacement bearing.

3. The refurbishable fan assembly of claim 1, wherein the impeller assembly includes the impeller plate having the interior radial surface guide structure aperture with a notched alignment rib interior surface for receiving the replacement impeller drive shaft into the impeller plate.

4. The refurbishable fan assembly of claim 1, wherein the impeller assembly includes the impeller plate having the interior radial surface guide structure aperture as a threaded, notched alignment rib interior surface for receiving the replacement impeller drive shaft that is threaded into the impeller plate.

5. The refurbishable fan assembly of claim 1, wherein the impeller assembly is a refurbishable impeller assembly including the impeller drive shaft adhesively affixed to a replaceable shaft plate that is inserted within the interior radial surface guide structure aperture with an interior shaft plate guide wall of a re-used impeller plate to align the impeller drive shaft reduce noise and wear of the impeller drive shaft and balance rotation of the impeller plate.

6. The refurbishable fan assembly of claim 1, wherein the impeller assembly is a refurbishable impeller assembly including the impeller drive shaft inserted through a notched rib guide surface forming the interior radial surface guide structure aperture of a re-used impeller plate to mechanically affix the impeller drive shaft to a re-used impeller blade assembly and to align the impeller drive shaft with respect to the re-used impeller plate and re-used impeller blades in the bearing aperture for balance of rotation of the impeller drive shaft and the re-used impeller plate with respect to the refurbishable motor assembly.

7. The refurbishable fan assembly of claim 1, wherein the refurbishable motor assembly includes the replaceable bushing assembly disposed through a printed circuit board assembly (PCBA) central opening of a re-used PCBA and through a motor central opening of the re-used out-runner brushless DC motor.

8. The refurbish d-fan assembly of claim 1, wherein the refurbishable motor assembly includes the replaceable bushing assembly mechanically threaded to the re-used bushing mechanically affixed to the re-used exterior housing.

9. The refurbishable an assembly of claim 1, wherein the refurbishable motor assembly is operably coupled to the impeller assembly through insertion of an impeller drive shaft of the impeller assembly through the PCBA central opening, and the motor central opening.

10. A method of manufacturing a refurbishable fan assembly for an information handling system comprising:

assembling a refurbishable impeller assembly by inserting a replaceable impeller shaft through a notched rib interior radial surface guide structure aperture of a re-used impeller plate mechanically affixed to a re-used impeller blade assembly to align the replaceable impeller shaft with respect to the re-used impeller plate and re-used impeller blades to balance rotation of the re-used impeller plate with respect to an operably coupled refurbishable motor assembly;

assembling a replaceable bushing assembly by inserting a replaceable bearing within a replaceable inner bushing to form a bearing aperture;

assembling the refurbishable motor assembly by inserting the replaceable bushing assembly through an interior radial surface of a re-used bushing mechanically attached to a re-used exterior housing, and inserting the re-used bushing through a printed circuit board assembly (PCBA) central opening of a re-used out-runner brushless direct current (DC) motor;

inserting the replaceable impeller shaft within the bearing aperture of the replaceable bushing assembly; and operably coupling the re-used out-runner brushless DC motor to a power source to drive a plurality of motor electromagnets to generate an electro-magnetic field for driving rotation of the replaceable impeller shaft and the re-used impeller plate having a plurality of fixed magnets.

11. The method of claim 10, wherein the interior radial surface of the re-used bushing is threaded, and the replacement bushing assembly is operably coupled into the threaded interior radial surface of the re-used bushing.

12. The method of claim 10 further comprising:

riveting the re-used bushing to a re-used exterior housing of the refurbishable fan assembly.

13. The method of claim 10 further comprising:

operably coupling at least a portion of the replaceable impeller shaft to the re-used impeller plate via a threaded exterior surface of the replaceable impeller shaft applying counter-tension to rotation of the re-used impeller plate.

14. The method of claim 10, wherein the replaceable impeller shaft includes a slot for loosening or tightening of the replaceable impeller shaft within an interior radial surface of the re-used impeller plate.

* * * * *